United States Patent [19]
Jeter

[11] 4,027,792
[45] June 7, 1977

[54] LOOP FORMING CHAIN

[75] Inventor: Sheldon M. Jeter, LaGrange, Ga.

[73] Assignee: Milliken Research Corporation, Spartanburg, S.C.

[22] Filed: Apr. 5, 1973

[21] Appl. No.: 348,329

[52] U.S. Cl. .............................................. 198/618
[51] Int. Cl.² ......................................... B65G 15/00
[58] Field of Search .......... 198/195, 196, 197, 171, 198/154, 618

[56] References Cited
UNITED STATES PATENTS

| 1,332,305 | 3/1920 | Ross | 198/195 X |
| 3,756,378 | 9/1973 | Kuehl | 198/154 |

Primary Examiner—Evon C. Blunk
Assistant Examiner—Douglas D. Watts
Attorney, Agent, or Firm—H. William Petry; Earle R. Marden

[57] ABSTRACT

Chain or conveyor system for a machine to manufacture pile fabrics which have the blades thereof closely spaced by arranging the chain lugs on each chain in staggered relationship to the chain lugs on the next adjacent chain.

1 Claim, 4 Drawing Figures

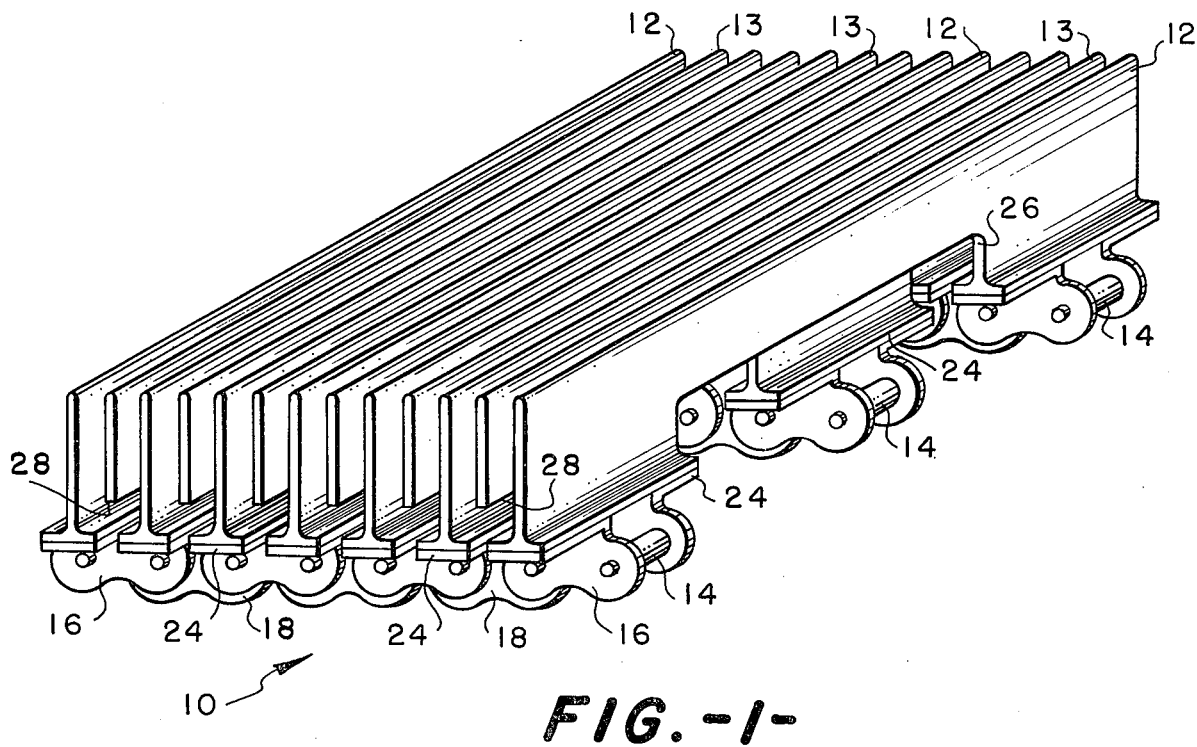
FIG.-1-
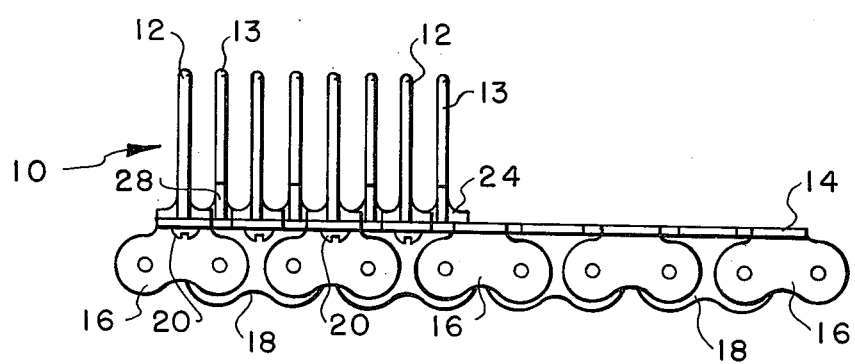
FIG.-2-

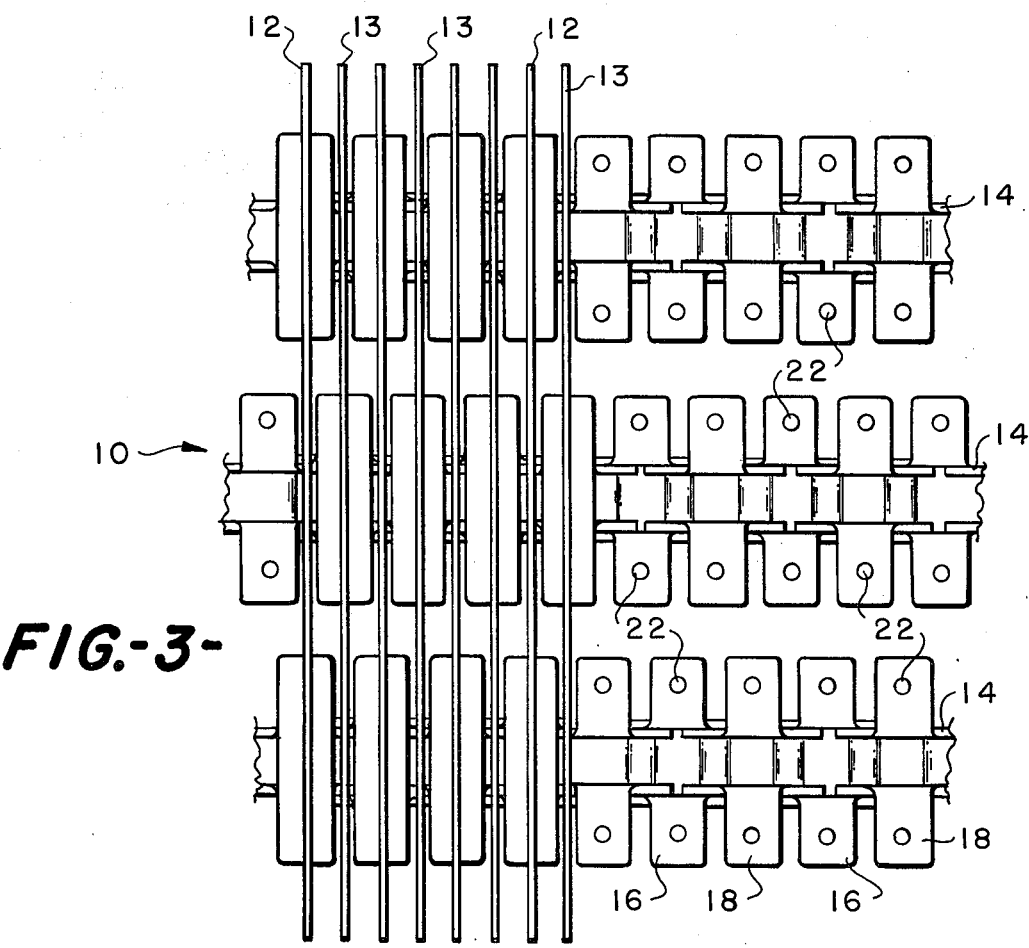
FIG.-3-
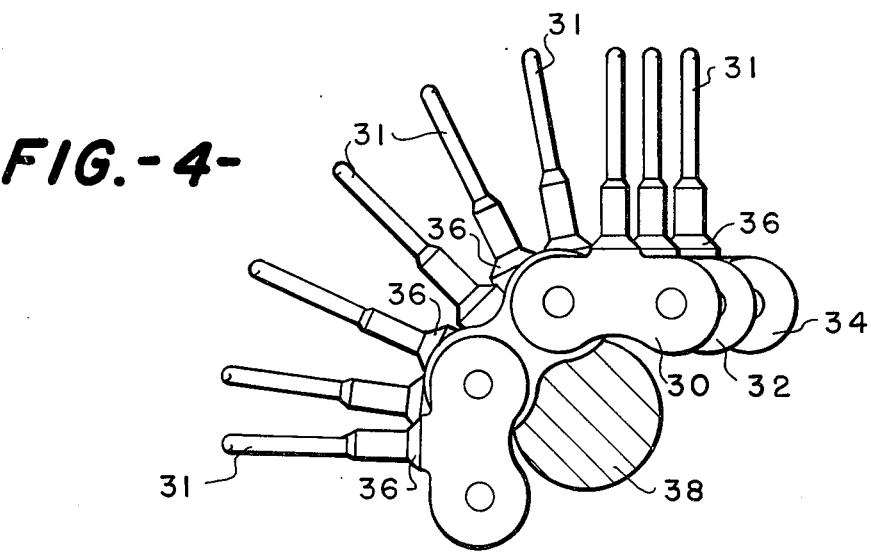
FIG.-4-

LOOP FORMING CHAIN

Machines for the manufacture of pile fabrics, such as soft floor covering and upholstery fabrics, and knitted fabrics often employ sets of blades, bars, or wires as elements. Such elements are usually connected together to form a flexible structure or are connected to some suitable flexible connector such as a normally endless, roller or bushing chain. Such flexible machine subsystems are commonly employed as yarn feeding means to control pattern formation in machines producing tufted or knitted fabric and as means for forming and conveying pile material in machines for the production of bonded fabrics. It is desired to assemble the blades, bars, or wires with small spacing between successive elements in order to produce well defined patterns, particularly on tufting machines having closely--spaced needles, and in order to produce bonded fabric having closely-spaced needles, and in order to produce bonded fabric having closely-spaced rows of pile material in order to minimize the appearance of unsightly longitudinal gaps between pile rows.

In order to produce bonded carpet having closely-spaced loops and to provide pattern-forming yarn feeding means for tufting machines producing fabric with closely-spaced longitudinal stitches, current practice requires assembly of the blades, bars, or wires into a flexible element of small circular pitch or the attachment of the blades, bars, or wires to a flexible element, such as a roller or bushing chain, of small circular pitch. Fabrication of flexible machine elements of small circular pitch is a necessarily delicate and expensive process: furthermore, the use of non-standard or uncommon components exacerbates problems of parts supply and machine maintenance.

It is therefore an object of this invention to provide a means for assembling the plurality of blades, bars, or wires into an apron or conveyor however closely spaced as is desired, while employing a flexible connector of relatively large circular pitch as the means for giving structural integrity to the assembly and as the means for driving the assembly.

Other objects and advantages of my invention will become clearly apparent as the specification proceeds to describe the invention with reference to the accompanying drawings, in which:

FIG. 1 is a perspective view of the novel chain or conveyor construction of this invention;

FIG. 2 is an elevation view of the chain or conveyor of FIG. 1;

FIG. 3 is a top view of the apparatus shown in FIGS. 1 and 2; and

FIG. 4 is a section view of a modification of the conveyor shown in FIGS. 1-3. Looking now to the drawings and particularly to the form of the invention shown in FIGS. 1-3, the reference numeral 10 generally denotes a chain or conveyor system which has blades 12 and 13 attached thereto to form yarn loops for a pile fabric. The conveyor system 10 consists of a plurality of chains 14, each of which is constructed from outside chain lugs 16 and inside chain lugs 18.

In the form of the invention shown in FIGS. 1-3 three chains 14 are employed with the center chain being staggered in relation to the two outside chains in order to allow the blades 12 and 13 to be located closer to each other. The center chain is one-half pitch advanced or retarded in relation to the outside chains so that the blades 12 and 13 are spaced from one another a distance equivalent to one-half pitch of the chain to which they are attached. If it is desired to space the blades 12 and 13 closer to each other more chains 14 can be employed with the spacing between blades 12 and 13 being equal to the pitch of the chains divided by the number of different chain positions whether advanced or retarded. Two chains in the same position like the outside chains in FIG. 1-3 are considered to be one chain position.

In FIGS. 1-3 the blades 12 and 13 are attached to the chain lugs 16 and 18 by means of screws 20 which project through apertures 22 in the chain lugs and are screwed into the foot 24 of the blades. Blades 12 are attached to the outside chains and blades 13 are attached to the inside chain. As shown in FIG. 1 the bottom of blade 12 is notched at 26 to accommodate the foot 24 of the next adjacent blade 13 and the blades 13 are notched at 28 to accommodate the foot 24 of the next adjacent blades 12. These notches 26 and 28 allow clearance for the foot 24 of the blades when the chains pass over or around a roller or sprocket.

FIG. 4 is a modification of the conveyor system shown in FIGS. 1-3 and employs extruded metal blades 31 which are welded or otherwise secured to the chain lugs 30, 32 and 34. In FIG. 4 the chain lugs 30 are advanced a distance equal to one-third of the pitch of the chain from the chain lug 32 and the chain lug 32 is advanced the same distance from the chain 34 so that the distance between adjacent blades 31 is equal to one-third the pitch of the chain. In this form of the invention to provide clearance between adjacent blades both side of the chain lugs 30, 32 and 34 are chamfered at 36 to prevent the blades 31 from interfering with one another as they pass around a roller or sprocket 38.

Although I have described in detail the specific embodiments of my invention I contemplate that changes may be made without departing from the scope or spirit of my invention and I desire to be limited by the scope of the claims.

That which is claimed is:

1. An improved chain construction for a conveyor system comprising: at least two chains spaced from one another, each of said chains having alternately connected inside chain lugs and outside chain lugs, each of said chain lugs of each chain having attaching elements connected thereto, a first elongated element mounted on the attaching element of the outside lug of the first chain, a second elongated element mounted adjacent and substantially parallel to the first elongated element on the attaching element of the outside lug of the second chain, a third elongated element mounted adjacent and substantially parallel to said second elongated element on the inside lug of said first chain and means maintaining said chains and elongated elements in a fixed relationship to one another, each of the elongated elements mounted on one chain having a cut out portion adjacent the attaching element of the other chain to prevent interference.

* * * * *